United States Patent
Yoshida et al.

(10) Patent No.: US 11,269,070 B2
(45) Date of Patent: Mar. 8, 2022

(54) RADAR APPARATUS

(71) Applicant: MITSUBISHI ELECTRIC CORPORATION, Tokyo (JP)

(72) Inventors: Naoto Yoshida, Tokyo (JP); Ryuhei Takahashi, Tokyo (JP); Nobuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 16/475,430

(22) PCT Filed: Feb. 27, 2017

(86) PCT No.: PCT/JP2017/007332
§ 371 (c)(1),
(2) Date: Jul. 2, 2019

(87) PCT Pub. No.: WO2018/154748
PCT Pub. Date: Aug. 30, 2018

(65) Prior Publication Data
US 2019/0369223 A1 Dec. 5, 2019

(51) Int. Cl.
*G01S 13/522* (2006.01)
*G01S 7/295* (2006.01)
*G01S 7/288* (2006.01)

(52) U.S. Cl.
CPC ........... *G01S 13/522* (2013.01); *G01S 7/288* (2013.01); *G01S 7/295* (2013.01)

(58) Field of Classification Search
None
See application file for complete search history.

(56) References Cited

U.S. PATENT DOCUMENTS

2015/0061922 A1* 3/2015 Kishigami ............ G01S 7/292
342/147

FOREIGN PATENT DOCUMENTS

| JP | 4946101 B2 | 6/2012 |
| JP | 4967218 B2 | 7/2012 |
| JP | 6035165 B2 | 11/2016 |

OTHER PUBLICATIONS

Indian Office Action for Indian Application No. 201947031355, dated Jan. 14, 2021, with English translation.
(Continued)

*Primary Examiner* — Whitney Moore
(74) *Attorney, Agent, or Firm* — Birch, Stewart, Kolasch & Birch, LLP

(57) ABSTRACT

A radar apparatus includes a transmitting array antenna that transmits signals orthogonal to one another from a plurality of transmitting antennas, a receiving array antenna that receives the signals reflected from a target by a plurality of receiving antennas, and a signal processing unit that detects the target from reception signals received by the plurality of receiving antennas. The signal processing unit includes a correlation matrix calculation unit that determines a first correlation matrix corresponding to the transmitting array antenna and a second correlation matrix corresponding to the receiving array antenna, on the basis of the reception signals separated by a separation unit, and a detection unit that detects the target on the basis of an evaluation value calculated using eigenvectors of the first correlation matrix and the second correlation matrix.

9 Claims, 6 Drawing Sheets

(56) References Cited

OTHER PUBLICATIONS

Li et al. "MIMO Radar with Colocated Antennas", IEEE Signal Processing Magazine, Sep. 2007, vol. 24, No. 5, p. 106-114.
Pillai et al. "Forward/Backward Spatial Smoothing Techniques for Coherent Signal Identification", IEEE Transaction on Acoustics, Speech, and Signal Processing, Jan. 1989, vol. 37, No. 1, p. 8-15.
Tabrikian et al. "Transmission Diversity Smoothing For Multi-Target Localization", Proceedings of the 2005 IEEE International Conference on Acoustics, Speech, and Signal Processing, 2005, vol. 4, IV/1041-IV/1044.
Xu et al. "Target Detection and Parameter Estimation for MIMO Radar Systems", IEEE Transaction on Aerospace and Electronic Systems, Jul. 2008, vol. 44, No. 3, p. 927-939.

\* cited by examiner

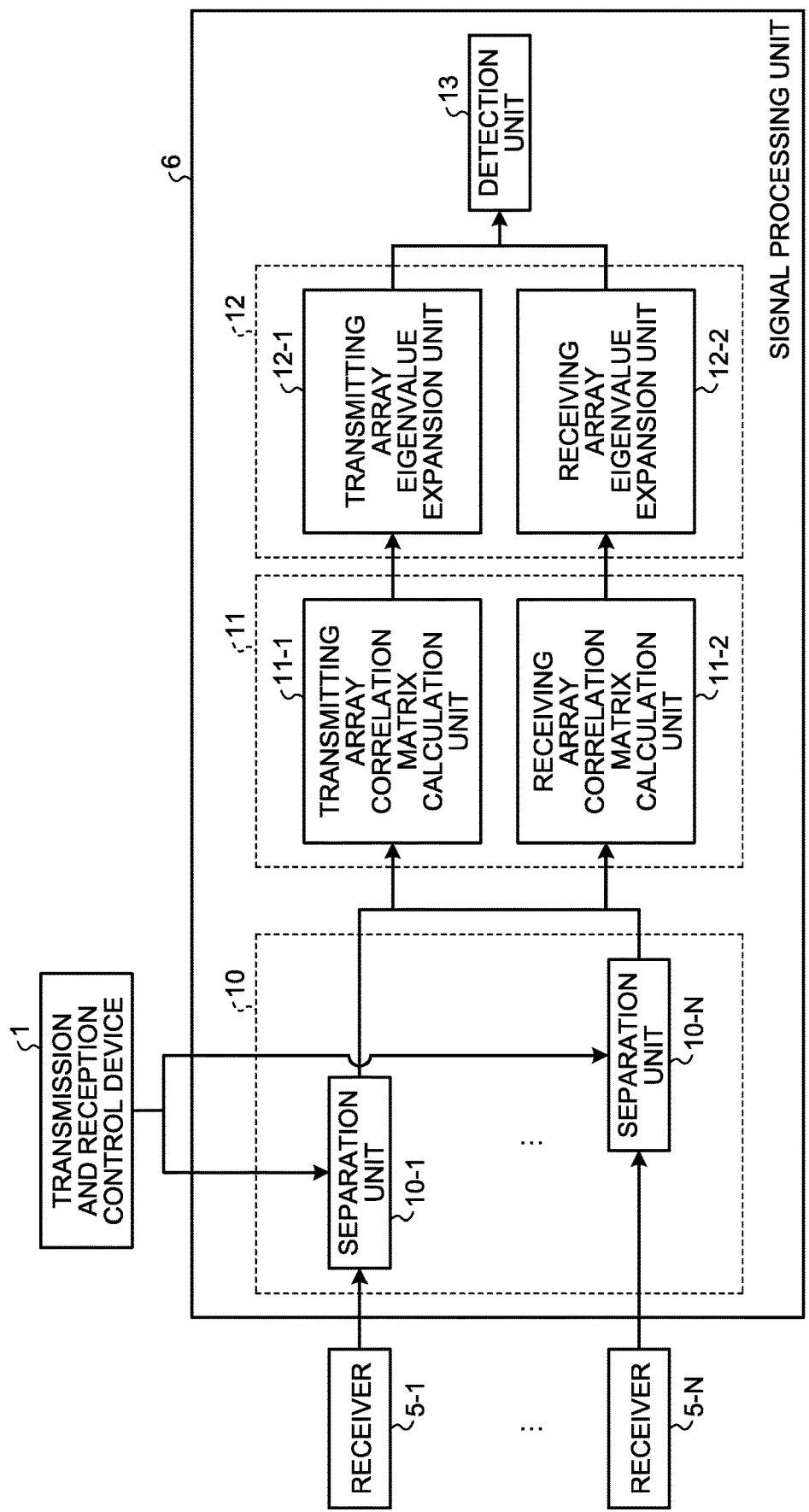

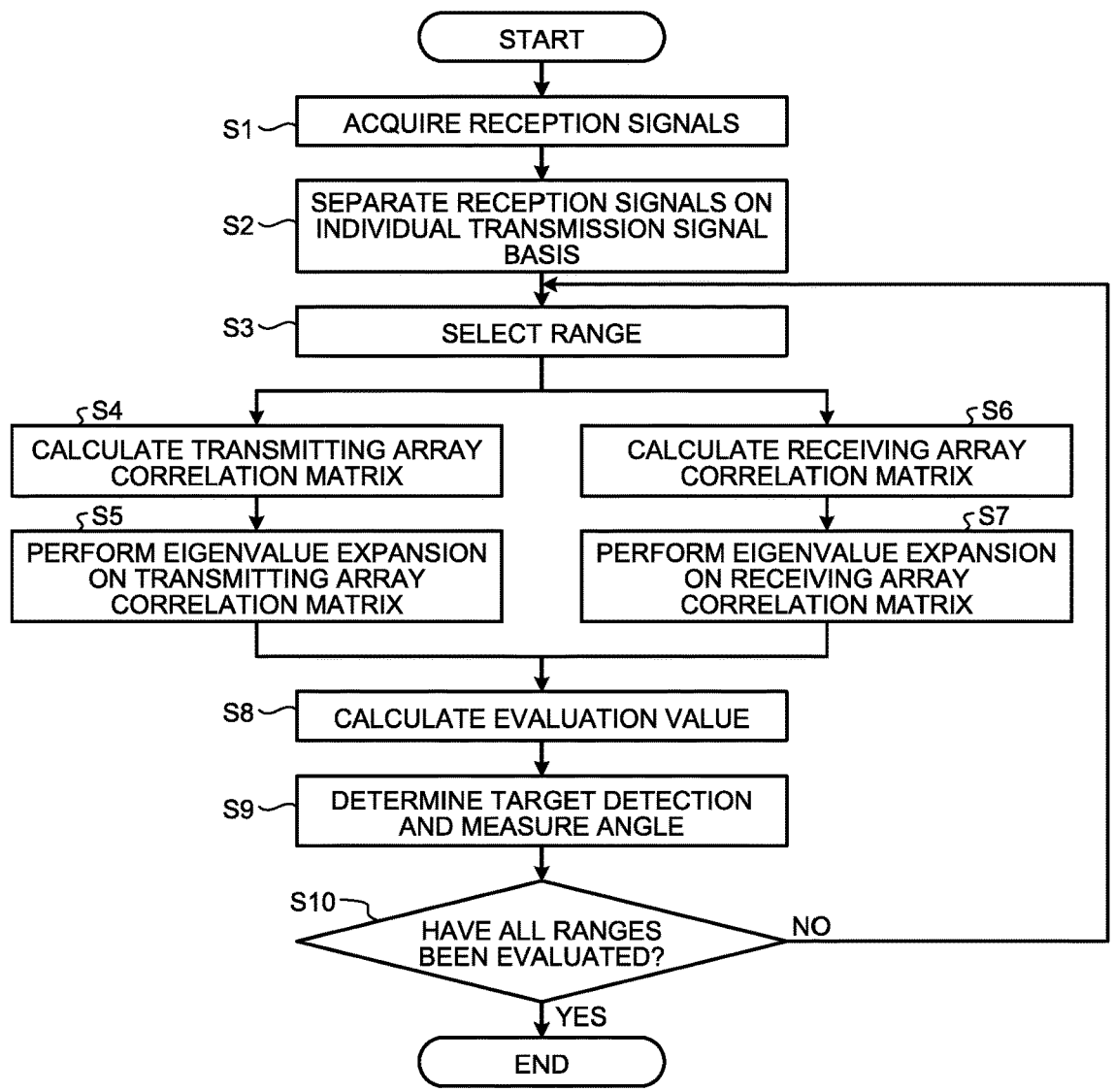
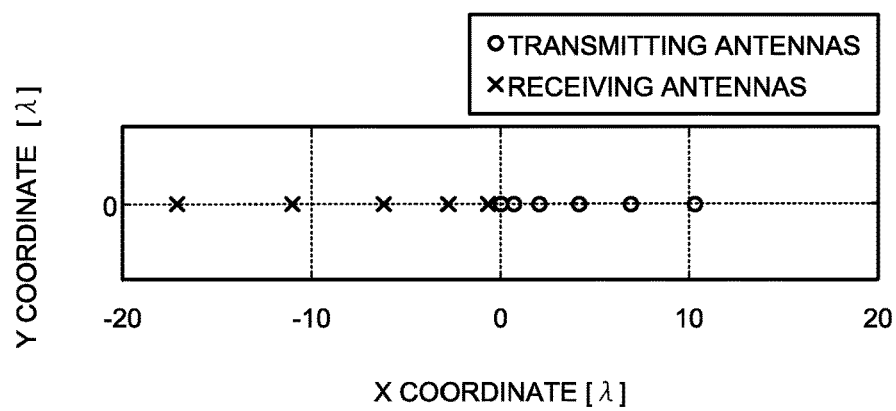

RADAR APPARATUS

FIELD

The present invention relates to a radar apparatus for detecting observed objects such as moving objects and stationary objects.

BACKGROUND

In order to improve the angular resolution of a radar apparatus, it is necessary to widen the antenna aperture. However, there is a limit to increasing the size of the antenna in terms of cost and installability. In view of this, a plurality of transmitting antennas and receiving antennas are arranged in a distributed manner to form an array antenna with an equivalently large aperture. The array antenna provides an improved angular resolution as well as preventing upsizing of each antenna. Such an antenna is called a distributed array antenna.

However, when a search radar intended for target detection in search coverage is composed of a distributed array antenna, a main lobe has a narrow beam width, resulting in degraded search efficiency. To address this issue, Multi-Input Multi-Output (MIMO) radar technology is applied to a distributed array antenna to form a transmission multibeam by reception signal processing, such that the degradation of search efficiency due to beam width reduction can be prevented. Also, the application of MIMO radar technology can improve angle measurement accuracy (Non Patent Literature 1).

CITATION LIST

Non Patent Literature

Non Patent Literature 1: J. Li and P. Stoica, "MIMO Radar with Colocated Antennas", IEEE Signal Process. Mag., Vol. 24, no. 5, p. 106-114, 2007.

SUMMARY

Technical Problem

The distributed array configuration improves the angular resolution, but increases beam side lobes in which case, when reflected waves from a plurality of targets arrive from different directions at the same range, a reflected wave from a target with low reception intensity is buried in beam side lobes of a target with high reception intensity. This results in a problem of failure to separately detect a plurality of targets.

This invention has been made in view of the above problem, and its object is to provide a radar apparatus capable of separately detecting a plurality of target reflected waves while preventing degradation in angular resolution and increase in beam side lobes.

Solution to Problem

A radar apparatus according to the present invention comprises: a transmitting array antenna to transmit signals orthogonal to one another from a plurality of transmitting antennas; a receiving array antenna to receive the signals reflected from a target by a plurality of receiving antennas; and a signal processing unit to detect the target from reception signals received by the plurality of receiving antennas, the signal processing unit comprising: a separation unit to separate the reception signals received by the plurality of receiving antennas, into signals corresponding to transmission signals from the plurality of transmitting antennas; a correlation matrix calculation unit to, on a basis of the reception signals separated by the separation unit, determine a first correlation matrix corresponding to the transmitting array antenna and a second correlation matrix corresponding to the receiving array antenna; and a detection unit to detect the target on the basis of an evaluation value calculated using eigenvectors of the first correlation matrix and the second correlation matrix.

Advantageous Effects of Invention

The radar apparatus of this invention, which is configured as described above, can thus separately detect reflected waves from a plurality of targets while preventing deterioration in angular resolution and increase in beam side lobes.

BRIEF DESCRIPTION OF DRAWINGS

FIG. 2 is a functional block diagram illustrating the configuration of a signal processing unit of the radar apparatus in the first embodiment of the present invention.

FIG. 3 is a flowchart illustrating the operation of the signal processing unit of the radar apparatus in the first embodiment of the present invention.

FIG. 4 is a graph illustrating an example of an arrangement of antennas of the radar apparatus in the first embodiment of the present invention.

DESCRIPTION OF EMBODIMENTS

Figure 1:
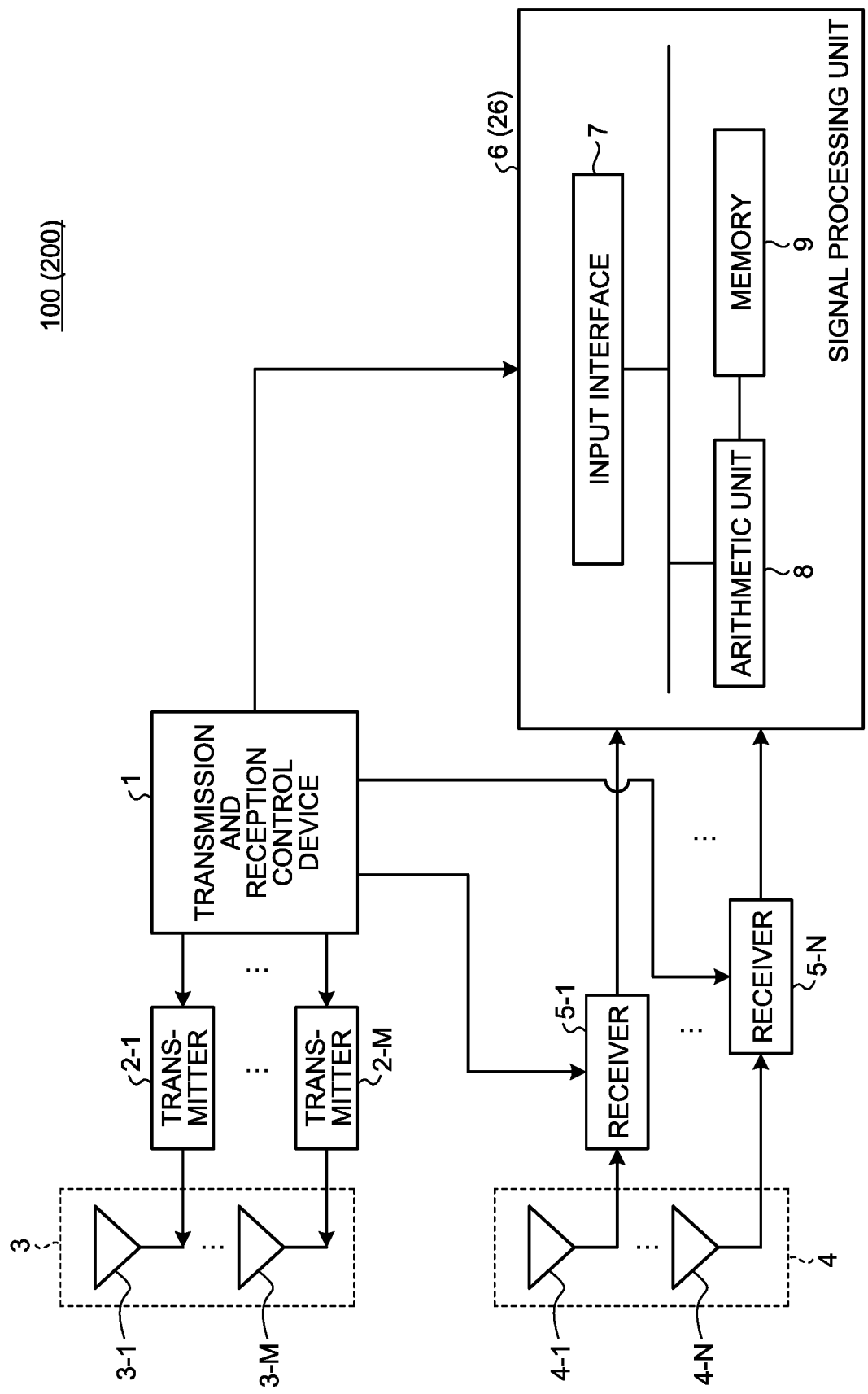
FIG. 1 is a hardware configuration diagram of a radar apparatus in a first embodiment of the present invention.

Hereinafter, embodiments of the present invention will be described with reference to the drawings. In the drawings, the same reference numerals are assigned to the same or similar components. Note that the following embodiments are an example of the present invention, and the present invention is not limited to the following embodiments. Targets in the following description are objects observed by a radar apparatus, and include moving objects and stationary objects.

First Embodiment

FIG. 1 is a diagram illustrating an example of the hardware configuration of a radar apparatus 100 according to a first embodiment of the present invention. In FIG. 1, the radar apparatus 100 of the present invention includes a transmission and reception control device 1, transmitters 2-1 to 2-M, a transmitting array antenna 3, a receiving array antenna 4, receivers 5-1 to 5-N, and a signal processing unit 6. The transmitting array antenna 3 is made up of transmitting antennas 3-1 to 3-M. The receiving array antenna 4 is made up of receiving antennas 4-1 to 4-N. The number of transmission channels M and the number of reception channels N are both natural numbers of two or more. M and N need not be the same number. The signal processing unit 6 includes an input interface 7, an arithmetic unit 8, and a memory 9.

The transmission and reception control device 1 transmits, to the transmitters 2-1 to 2-M, transmission signal information and transmission timing information necessary for generating transmission signals orthogonal to one another. The transmission and reception control device 1, transmits to the receivers 5-1 to 5-N, reception timing information necessary for generating reception signals. Further, the transmission and reception control device 1, transmits to the signal processing unit 6, the transmission signal information, the transmission timing information, and the reception timing information.

The transmitters 2-1 to 2-M modulate and amplify transmission waves, using the transmission signal information and the transmission timing information transmitted from the transmission and reception control device 1, and output the modulated and amplified transmission waves to the corresponding transmitting antennas 3-1 to 3-M.

The transmitting antennas 3-1 to 3-M radiate the transmission waves output from the transmitters 2-1 to 2-M into space.

The receiving antennas 4-1 to 4-N receive the transmission waves radiated from the transmitting antennas 3-1 to 3-M and subsequently reflected back from a target. That is, the receiving antennas 4-1 to 4-N receive the waves reflected from the target. Then, the receiving antennas 4-1 to 4-N output the received waves to the corresponding receivers 5-1 to 5-N.

On the basis of the reception timing information transmitted from the transmission and reception control device 1, the receivers 5-1 to 5-N perform amplification, frequency conversion, and Analog to Digital (A/D) conversion on the reflected waves received by the receiving antennas 4-1 to 4-N, such that the receivers 5-1 to 5-N generate reception signals. The reception signals are transmitted to the signal processing unit 6.

On the basis of the transmission signal information and the timing information transmitted from the transmission and reception control device 1, the signal processing unit 6 performs signal processing on the reception signals to thereby perform target detection and target position estimation.

The input interface 7 acquires the reception signals after the A/D conversion from the receivers 5-1 to 5-N, and acquires the transmission signal information, the transmission timing information, and the reception timing information from the transmission and reception control device 1. The acquired information is transmitted to the arithmetic unit 8 or the memory 9.

For example, a communication interface such as Peripheral Component Interconnect (PCI), PCI Express, Versa Module Eurocard (VME), or Universal Serial Bus (USB) may be used as the input interface 7 with the receivers 5-1 to 5-N. For example, a communication interface such as Ethernet (registered trademark) may be used as the input interface 7 with the transmission and reception control device 1.

Using the information acquired via the input interface 7, the arithmetic unit 8 performs signal processing operation on the reception signals transmitted from the receivers 5-1 to 5-N. For example, a Central Processing Unit (CPU) or a Field Programmable Gate Array (FPGA) may be used as the arithmetic unit 8.

The memory 9 holds programs describing the contents of signal processing performed by the arithmetic unit 8, reception signals in the middle of an operation, parameters, information acquired via the input interface 7, and others.

FIG. 2 is a functional block diagram of the signal processing unit 6 in the first embodiment of the present invention. In FIG. 2, the signal processing unit 6 includes separation units 10-1 to 10-N, a transmitting array correlation matrix calculation unit 11-1, a receiving array correlation matrix calculation unit 11-2, a transmitting array eigenvalue expansion unit 12-1, a receiving array eigenvalue expansion unit 12-2, and a detection unit 13. Hereinafter, the separation units 10-1 to 10-N are sometimes collectively referred to as the separation unit 10. The transmitting array correlation matrix calculation unit 11-1 and the receiving array correlation matrix calculation unit 11-2 are also collectively referred to as the correlation matrix calculation unit 11. The transmitting array eigenvalue expansion unit 12-1 and the receiving array eigenvalue expansion unit 12-2 are also collectively referred to as the eigenvalue expansion unit 12.

Using the information transmitted from the transmission and reception control device 1, the separation units 10-1 to 10-N separate the reception signals received by the corresponding receiving antennas 4-1 to 4-N on a per transmission signal basis. The separated reception signals are transmitted to the correlation matrix calculation unit 11.

Specifically, the separation unit 10-1 separates the reception signals received by the receiving antenna 4-1 into signals corresponding to the waveforms of the transmission signals transmitted from the transmitting antennas 3-1 to 3-M. Similarly, the separation unit 10-N separates the reception signals received by the receiving antenna 4-N into signals corresponding to the waveforms of the transmission signals transmitted from the transmitting antennas 3-1 to 3-M. The separated reception signals are transmitted to the transmitting array correlation matrix calculation unit 11-1 and the receiving array correlation matrix calculation unit 11-2.

The correlation matrix calculation unit 11 determines correlation matrices from the reception signals that have been separated by the separation units 10-1 to 10-N on a per transmission signal basis. The determined correlation matrices are transmitted to the eigenvalue expansion unit 12.

Specifically, the transmitting array correlation matrix calculation unit 11-1 generates reception signal vectors from the reception signals that have been separated by the separation units 10-1 to 10-N. The reception signal vectors generated by the unit 11-1 have elements that are the reception signals corresponding to the transmitting antennas 3-1 to 3-M. That is, N reception signal vectors having elements that are signals corresponding to the same receiving antenna are generated from the M×N reception signals that have been separated by the separation units 10-1 to 10-N. The transmitting array correlation matrix calculation unit 11-1 determines a correlation matrix, using this reception signal vectors. Hereinafter, this correlation matrix is referred to as a transmitting array correlation matrix or a first correlation matrix. The transmitting array correlation matrix is transmitted to the transmitting array eigenvalue expansion unit 12-1.

The receiving array correlation matrix calculation unit 11-2 generates reception signal vectors from the reception signals that have been separated by the separation units 10-1 to 10-N. The reception signal vectors generated by the unit 11-2 have elements that are the reception signals corresponding to the receiving antennas 4-1 to 4-N. That is, M reception signal vectors having elements that are N signals corresponding to the same transmitting antenna are generated from the M×N reception signals that have been separated by the separation units 10-1 to 10-N. The receiving array correlation matrix calculation unit 11-2 determines a correlation matrix, using theses reception signal vectors. Hereinafter, this correlation matrix is referred to as a receiving array correlation matrix or a second correlation matrix. The receiving array correlation matrix is transmitted to the receiving array eigenvalue expansion unit 12-2.

The eigenvalue expansion unit 12 performs eigenvalue expansion on the correlation matrices determined by the correlation matrix calculation unit 11, thereby obtaining eigenvalues and eigenvectors. The eigenvalues and the eigenvectors are transmitted to the detection unit 13.

Specifically, the transmitting array eigenvalue expansion unit 12-1 performs eigenvalue expansion on the transmitting array correlation matrix determined by the transmitting array correlation matrix calculation unit 11-1, thereby obtaining eigenvalues and eigenvectors. The eigenvalues and the eigenvectors are transmitted to the detection unit 13.

The receiving array eigenvalue expansion unit 12-2 performs eigenvalue expansion on the receiving array correlation matrix determined by the receiving array correlation matrix calculation unit 11-2, thereby obtaining eigenvalues and eigenvectors. The eigenvalues and the eigenvectors are transmitted to the detection unit 13. The eigenvalues and the eigenvectors are transmitted to the detection unit 13.

The detection unit 13 calculates evaluation values, using the eigenvalues and the eigenvectors obtained by the transmitting array eigenvalue expansion unit 12-1 and the receiving array eigenvalue expansion unit 12-2. On the basis of the evaluation values, the detection unit 13 detects a plurality of targets separately and estimates the angles of arrival of the plurality of targets.

The functions of the separation units 10-1 to 10-N, the transmitting array correlation matrix calculation unit 11-1, the receiving array correlation matrix calculation unit 11-2, the transmitting array eigenvalue expansion unit 12-1, the receiving array eigenvalue expansion unit 12-2, and the detection unit 13 are implemented by the arithmetic unit 8 executing the programs stored in the memory 9.

Of the functions of the separation units 10-1 to 10-N, the function of acquiring reception signals from the receivers 5-1 to 5-N and the function of acquiring transmission signal information and timing information from the transmission and reception control device 1 are implemented by the input interface 7.

Next, the operation of the signal processing unit 6 of the radar apparatus 100 according to the first embodiment of the present invention will be described with reference to FIG. 3. FIG. 3 is a flowchart illustrating the operation of the signal processing unit 6 according to the first embodiment of the present invention.

In step S1, the separation units 10-1 to 10-N acquire reception signals received by the receiving antennas 4-1 to 4-N. Also, the separation units 10-1 to 10-N acquire transmission signal information and timing information transmitted from the transmission and reception control device 1.

In step S2, the separation units 10-1 to 10-N separate the reception signals received by the receiving antennas 4-1 to 4-N into signals corresponding to the waveforms of transmission signals from the transmitting antennas 3-1 to 3-M. For the separation of the transmission signals, for example, when the transmission scheme is a code MIMO scheme, matching filters by means of transmission signal replicas are used.

In step S3, the transmitting array correlation matrix calculation unit 11-1 and the receiving array correlation matrix calculation unit 11-2 select, from among all ranges that are to be evaluated, one range, and extract samples at the selected range from the reception signals that have been separated into the signals corresponding to the transmission signals in step S2.

Here, the reason for extracting samples for each range will be described.

In general, target reflected waves that have passed through matching filters are compressed only to samples of one range or samples of a small number of ranges. Thus, it is necessary to detect the targets separately and measure the angle of the target on a per range sample. For simplicity, consider transmission signals completely orthogonal to one another. Reception signal vectors generated from the reception signals that have passed through the matching filters at a certain range are represented by an M×N matrix X of expression (1). In other words, N reception signal vectors having elements that are reception signals corresponding to the transmitting antennas 3-1 to 3-M, or M reception signal vectors having elements that are reception signals corresponding to the receiving antennas 4-1 to 4-N can be collectively represented in one matrix as in expression (1). The matrix X is obtained for each range. Note that K represents the number of targets at the range, $u_k$ represents the arrival direction vector of the kth target reflected wave, $\beta_k$ represents a complex coefficient, $a_t(u)$ and $a_r(u)$ represent transmitting array and receiving array steering vectors, respectively, and Z represents noise components after passing through the matching filters. A superscript T represents transposition. Note that matrices and vectors are shown in boldface characters in mathematical expressions, but they are still in small characters in the text.

[Formula 1]

$$X = \sum_{k=1}^{K} \beta_k a_t(u_k) a_r^T(u_k) + Z \quad (1)$$

Reference is made back to the flowchart.

In step S4, the transmitting array correlation matrix calculation unit 11-1 determines a transmitting array correlation matrix, using the reception signal vectors generated from the separated reception signals in step S3. Specifically, the transmitting array correlation matrix calculation unit 11-1 determines a transmitting array correlation matrix $R_t$ shown in expression (2), using the matrix X composed of the reception signal vectors generated from the reception signals that have been separated into the signals corresponding to the transmission signals. A superscript H represents complex conjugate transpose.

The transmitting array correlation matrix $R_t$ determined by the transmitting array correlation matrix calculation unit 11-1 is transmitted to the transmitting array eigenvalue expansion unit 12-1.

[Formula 2]

$$R_t = XX^H/N \quad (2)$$

In step S5, the transmitting array eigenvalue expansion unit 12-1 performs eigenvalue expansion on the transmitting array correlation matrix $R_t$ determined in step S4. Eigenvalues and eigenvectors after the eigenvalue expansion satisfy the relationship of expression (3). Note that $\lambda_k$ represents the kth eigenvalue when the eigenvalues of the transmitting array correlation matrix $R_t$ are arranged in descending order of values (k is a natural number of one or more and M or less, and $\lambda_1 \geq \lambda_2 \geq \ldots$), and $e_{t,k}$ represents an eigenvector corresponding to the eigenvalue $\lambda_k$.

The eigenvalues and the eigenvectors obtained by the transmitting array eigenvalue expansion unit 12-1 are transmitted to the detection unit 13.

[Formula 3]

$$R_t = \sum_{m=1}^{M} \lambda_m e_{t,m} e_{t,m}^H \quad (3)$$

In step S6, the receiving array correlation matrix calculation unit 11-2 determines a receiving array correlation matrix, using the reception signal vectors generated from the separated reception signals in step S3. Specifically, the receiving array correlation matrix calculation unit 11-2 determines a receiving array correlation matrix $R_r$ shown in expression (4), using the matrix X composed of the reception signal vectors generated from the reception signals that have been separated into the signals corresponding to the transmission signals.

The receiving array correlation matrix $R_r$ determined by the receiving array correlation matrix calculation unit 11-2 is transmitted to the receiving array eigenvalue expansion unit 12-2.

[Formula 4]

$$R_r = X^T (X^T)^H / M \quad (4)$$

In step S7, the receiving array eigenvalue expansion unit 12-2 performs eigenvalue expansion on the receiving array correlation matrix $R_r$ determined in step S6. Eigenvalues and eigenvectors after the eigenvalue expansion satisfy the relationship of expression (5). Note that $\lambda_k$ represents the kth eigenvalue when the eigenvalues of the receiving array correlation matrix $R_r$ are arranged in descending order of values (k is a natural number of one or more and N or less, and $\lambda_1 \geq \lambda_2 \geq \ldots$), and $e_{r,k}$ represents an eigenvector corresponding to the eigenvalue $\lambda_k$.

The eigenvalues and the eigenvectors obtained by the receiving array eigenvalue expansion unit 12-2 are transmitted to the detection unit 13.

[Formula 5]

$$R_r = \sum_{n=1}^{N} \lambda_n e_{r,n} e_{r,n}^H \quad (5)$$

In step S8, the detection unit 13 calculates, from the eigenvalues and the eigenvectors determined in steps S5 and S7, an evaluation value used for detection of the target and measurement of the angle of the target. As an example, an evaluation value as in expression (6) can be used.

[Formula 6]

$$P_k(u) = \frac{|a_t^H(u) e_{t,k} e_{r,k}^T a_r^*(u)|^2}{[a_t^H(u) a_t(u)][a_r^H(u) a_r(u)]} \quad (6)$$

In step S9, the detection unit 13 detects a target, using an evaluation value $P_k(u)$ calculated with an arrival direction vector u varied with respect to eigenvectors (hereinafter, also referred to as target signal eigenvectors) corresponding to an eigenvalue equal to or greater than a predetermined value. For example, using eigenvectors $e_{t,k}$ and $e_{r,k}$ corresponding to an eigenvalue $\lambda_k$ equal to or greater than a predetermined value, the evaluation value $P_k(u)$ is determined with the arrival direction vector u varied. It can be determined that a target reflected wave has arrived from a direction corresponding to the arrival direction vector u when the evaluation value $P_k(u)$ is a value close to one. If there are two eigenvalues equal to or greater than the predetermined value, an evaluation value $P_1(u)$ using eigenvectors $e_{t,1}$ and $e_{r,1}$ corresponding to an eigenvalue $\lambda_1$ of the largest value, and an evaluation value $P_2(u)$ using eigenvectors $e_{t,2}$ and $e_{r,2}$ corresponding to an eigenvalue $\lambda_2$ of the second largest value may be determined to determine the presence or absence of a reflected wave from a target and an arrival direction at each of the evaluation values.

In step S10, the transmitting array correlation matrix calculation unit 11-1 and the receiving array correlation matrix calculation unit 11-2 determine whether all the ranges that should be selected have been evaluated, that is, whether the processing from step S3 to step S9 have been performed on all the ranges. When the evaluation has been completed (yes), the process is finished. If not (no), the process returns to step S3 to start the processing for the next range.

Here, the reason why the radar apparatus 100 of the present embodiment can separately detect a plurality of target reflected waves that have arrived from different directions will be described in comparison with prior art.

First, the prior art will be described. Distributed array antennas have a problem of beam side lobes being so high that, when reflected waves from a plurality of targets arrive from different directions at the same range, a reflected wave from a target with low reception intensity is buried in beam side lobes of a target with high reception intensity. The plurality of target reflected waves arriving from different directions at the same range/with the same Doppler are in a coherent relationship with one another, and thus separation of coherent waves is necessary to solve the above problem.

Spatial averaging is widely used to separate coherent waves (Non Patent Literature 2). However, spatial averaging requires that an array antenna be separable into a plurality of isomorphic sub-arrays or be separable into sub-arrays having conjugate centrosymmetry; thus, such spatial averaging is not a technique applicable to array antennas of arbitrary shapes. On the other hand, distributed array antennas used in radars are often arranged at irregular intervals and asymmetrically to prevent occurrence of grating lobes. It is thus difficult to apply spatial averaging to distributed array antennas.

Non Patent Literature 2: S. U. Pillai, and B. H. Kwon, "Forward/backward spatial smoothing techniques for coherent signal identification", IEEE Trans. on Acoustics, Speech and Signal Processing, vol. 37, pp. 8-15, 1989.

Methods for separating coherent waves using the characteristics of MIMO radars are, for example, a technique called Generalized Likelihood Ratio Test (GLRT) (Non Patent Literature 3) and a technique called Transmission Diversity Smoothing (TDS) (Non Patent Literature 4). These techniques have an advantage of being applicable to arbitrary array shapes as long as a MIMO radar system is applied.

Non Patent Literature 3: L. Z. Xu, J. Li, and P. Stoica, "Target detection and parameter estimation for MIMO radar systems", IEEE Trans. Aerosp. Electron. Syst., Vol. 44, no. 3, pp. 927-939, 2008.

Non Patent Literature 4: J. Tabrikian, and I. Bekkerman, "Transmission diversity smoothing for multi-target localization", Proceedings of the 2005 IEEE International Conference on Acoustics, Speech, and Signal Processing, vol. 4, iv/1041-iv/1044, 2005.

Unfortunately, GLRT requires a large number of snapshots and has a problem of high computational load.

For transmission diversity smoothing, angular resolution is determined by the aperture length of a receiving array antenna. For this reason, the aperture length is narrower than that of a virtual array antenna of a MIMO radar (an array antenna having an aperture virtually expanded taking into consideration the phase rotation of reception signals due to transmitting array antenna arrangement in addition to receiving array antenna arrangement). As a result, angular resolution is degraded. Further, beam side lobes are increased.

By contrast, as shown in expression (2), the radar apparatus 100 in the first embodiment of the present invention determines the transmitting array correlation matrix $R_t$ with reception signals corresponding to the receiving antennas 4-1 to 4-N as snapshots. This is processing equivalent to spatial averaging when the virtual array antenna (M×N) of the MIMO radar is divided into sub-arrays that are of the same shape as the transmitting array antenna 3 consisting of the transmitting antennas 3-1 to 3-M, and are the same in number as the receiving antennas (N). Thus, as in spatial averaging, in the transmitting array correlation matrix $R_t$, cross-correlation components between coherent waves are suppressed, enabling coherent wave separation.

Further, as shown in expression (4), the radar apparatus 100 determines the receiving array correlation matrix $R_r$ with reception signals corresponding to the transmitting antennas 3-1 to 3-M as snapshots. This is processing equivalent to spatial averaging when the virtual array antenna (M×N) of the MIMO radar is divided into sub-arrays that are of the same shape as the receiving array antenna 4 consisting of the receiving antennas 4-1 to 4-N, and are the same in number as the transmitting antennas (M). Thus, as in spatial averaging, in the receiving array correlation matrix $R_r$, cross-correlation components between coherent waves are suppressed, enabling coherent wave separation.

As described above, the radar apparatus 100 in the first embodiment of the present invention achieves separation of coherent waves by spatial averaging, utilizing the characteristics that the virtual array antenna of the MIMO radar can be divided into sub-arrays of the same shape as that of the receiving array antenna 4, and divided into sub-arrays of the same shape as that of the transmitting array antenna 3, no matter what array shape the transmitting array antenna 3 and the receiving array antenna 4 have.

Furthermore, transmission diversity smoothing, which is a conventional technique, is processing equivalent to using only the above-described receiving array correlation matrix $R_r$. However, only with the eigenvector $e_{r,k}$ determined from the receiving array correlation matrix $R_r$, angular resolution and beam side lobes are determined by the receiving array antenna shape. For this reason, the angular resolution and beam side lobes are degraded compared to angular resolution and beam side lobes by the virtual array antenna of the conventional MIMO radar.

By contrast, unlike the conventional transmission diversity smoothing using only eigenvalues and eigenvectors of a receiving array correlation matrix, the signal processing unit 6 of the radar apparatus 100 of the present invention features calculating an evaluation value, using eigenvectors of the receiving array correlation matrix $R_r$ and the transmitting array correlation matrix $R_t$. By determining an evaluation value using the transmitting array correlation matrix $R_t$ in addition to the receiving array correlation matrix $R_r$, it becomes possible to obtain angular resolution and beam side lobes equivalent to those of the virtual array antenna of the conventional MIMO radar.

As described above, the radar apparatus 100 in the first embodiment of the present invention is characterized in that the radar apparatus 100 includes the plurality of transmitting antennas 3-1 to 3-M that transmit signals orthogonal to one another and the plurality of receiving antennas 4-1 to 4-N, performs processing of calculation of a transmitting array correlation matrix (step S4) and its eigenvalue expansion (step S5) in addition to processing of calculation of a receiving array correlation matrix (step S6) and its eigenvalue expansion (step S7) used in transmission diversity smoothing of a conventional technique, and calculates an evaluation value using the two kinds of eigenvalues and eigenvectors (step S8). This enables, in an array of an arbitrarily shape, separate detection and angle measurement of a plurality of coherent target reflected waves while preventing degradation in angular resolution and increase in beam side lobes. The expression "an array of an arbitrarily shape" means that antennas may be arranged at regular or irregular intervals, and antennas may be arranged in one to three dimensions.

Next, an example of target detection of the radar apparatus 100 according to the first embodiment of the present invention will be described with reference to FIGS. 4 to 6.

FIG. 4 is a graph illustrating an example of the arrangement of transmitting antennas and receiving antennas. In FIG. 4, the horizontal axis indicates horizontal positions of the antennas, and the vertical axis indicates vertical positions of the antennas.

Figure 5:
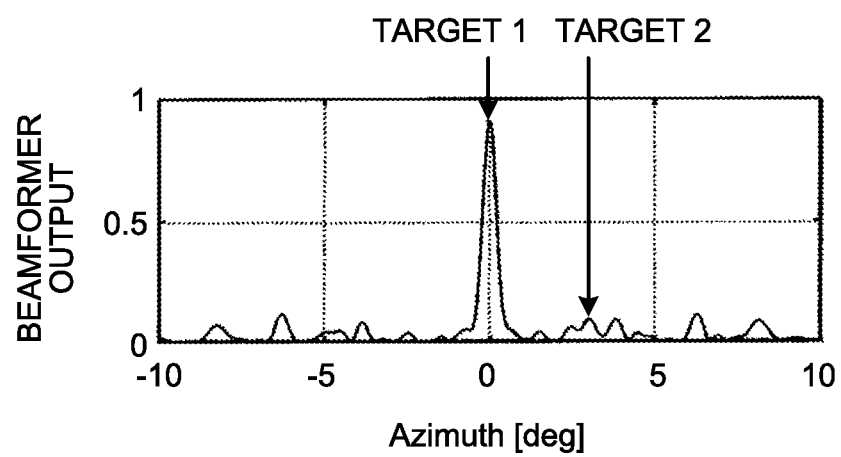
FIG. 5 is a graph illustrating an example of beamformer output in a conventional radar apparatus.

FIG. 5 is a graph illustrating an example of detection results provided by a conventional radar apparatus. In FIG. 5, the horizontal axis indicates the arrival directions from which the reflected waves arrive, and the vertical axis indicates output values by a beamformer.

Figure 6:
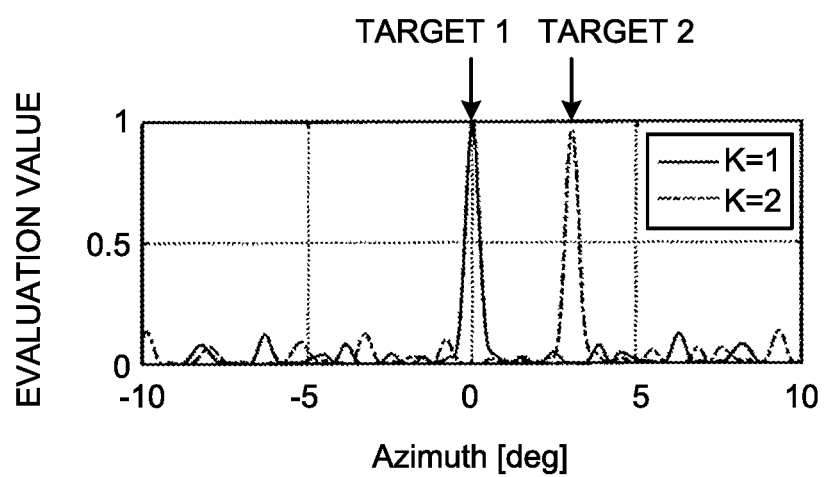
FIG. 6 is a graph illustrating an example of evaluation values of the radar apparatus in the first embodiment of the present invention.

FIG. 6 is a graph illustrating an example of detection results provided by the radar apparatus 100 in the first embodiment of the present invention. In FIG. 6, the horizontal axis indicates the arrival directions from which the reflected waves arrive, and the vertical axis indicates evaluation values.

As illustrated in FIG. 4, the MIMO radar is provided by an array antenna having six transmitting antennas and six receiving antennas (M=N=6). The transmitting antennas and the receiving antennas are both arranged at irregular intervals. A reflected wave of a target 1 arrives from a direction of an azimuth angle of 0°, and a reflected wave of a target 2 arrives from a direction of an azimuth of 3°.

When the received power of the target 1 is 10 dB higher than the received power of the target 2, in conventional beam forming using fixed weights, the reflected wave from the target 2 is buried in beam side lobes of the target 1 as illustrated in FIG. 5, and the target 2 cannot be detected separately from the target 1.

By contrast, when the evaluation value of expression (6) is used as in the radar apparatus 100 in the embodiment of the present invention, the targets 1 and 2 can be separately detected as illustrated in FIG. 6.

The evaluation value shown in expression (6) uses the lengths of the projection of target signal eigenvectors and steering vectors, but is not limited to this. For example, noise subspaces may be used as in Multiple Signal Classification (MUSIC). When the noise subspace of the transmitting array correlation matrix $R_t$ is expressed as $E_{Nt}=[e_{t,K+1}, e_{t,K+2}, \ldots, e_{t,M}]$, and the noise subspace of the receiving array correlation matrix $R_r$ is expressed as $E_{Nr}=[e_{r,K+1}, e_{r,K+2}, \ldots, e_{r,N}]$, for example, the following evaluation value can be used.

[Formula 7]

$$P(u) = \frac{[a_t^H(u)a_t(u)][a_r^H(u)a_r(u)]}{|a_t^H(u)E_{Nt}E_{Nr}^T a_r^*(u)|^2} \quad (7)$$

As described above, the radar apparatus 100 of the first embodiment is configured to include a transmitting array antenna that transmits signals orthogonal to one another from a plurality of transmitting antennas, a receiving array antenna that receives the signals reflected from a target by a plurality of receiving antennas, and a signal processing unit that detects the target from reception signals received by the plurality of receiving antennas. The signal processing unit includes: a separation unit that separates the reception signals received by the plurality of receiving antennas, into signals corresponding to transmission signals from the plurality of transmitting antennas; a correlation matrix calculation unit that, on the basis of the reception signals separated by the separation unit, determines a first correlation matrix corresponding to the transmitting array antenna and a second correlation matrix corresponding to the receiving array antenna; and a detection unit that detects the target on the basis of an evaluation value calculated using eigenvectors of the first correlation matrix and the second correlation matrix. Because the target is detected based on the eigenvectors of the first correlation matrix corresponding to the transmitting array antenna in addition to the eigenvectors of the second correlation matrix corresponding to the receiving array antenna, it becomes possible to separately detect a plurality of target reflected waves while eliminating or reducing degradation in angular resolution and increase in beam side lobes.

According to the radar apparatus 100 of the first embodiment, among the reception signals separated by the separation unit, the reception signals at the receiving antennas, which are snapshots, are used by the correlation matrix calculation unit to calculate the first correlation matrix while the reception signals corresponding to the transmitting antennas, which are snapshots, are used by the correlation matrix calculation unit to calculate the second correlation matrix. By thus performing processing equivalent to spatial averaging, it becomes possible to suppress cross-correlation components between coherent waves and separate the coherent waves.

The radar apparatus 100 of the first embodiment may be configured to calculate an evaluation value by combining eigenvectors corresponding to eigenvalues equal to or greater than a predetermined value. Thus, all eigenvectors are not necessarily required to be used. Using eigenvectors corresponding to eigenvalues of large values enables accurate target detection while reducing the amount of computation.

Second Embodiment

A second embodiment is a modification when the radar apparatus 100 is a pulse hit system.

The present embodiment will be described with the focus on differences from the first embodiment.

The configuration of the modification of the radar apparatus 100 in the second embodiment of the present invention is the same as the configuration illustrated in FIGS. 1 and 2, except for the operation of the correlation matrix calculation unit 11. The operation of the radar apparatus 100 of the second embodiment will be described with reference to the flowchart illustrated in FIG. 3.

When the radar apparatus 100 is a pulse hit system, the transmitting array correlation matrix calculation unit 11-1 uses hit directions as snapshots when determining the transmitting array correlation matrix $R_t$ in step S4. At this time, the transmitting array correlation matrix $R_t$ can be determined by expression (8). Note that h represents a hit number, and E[•] represents an ensemble average.

[Formula 8]

$$R_t = \frac{1}{N} E[X(h) \cdot X(h)^H] \quad (8)$$

Likewise, in step S6, the receiving array correlation matrix calculation unit 11-2 uses hit directions as snapshots when determining the receiving array correlation matrix $R_r$. At this time, the receiving array correlation matrix $R_r$ can be determined by expression (9).

[Formula 9]

$$R_r = \frac{1}{M} E\left[X(h) \cdot (X(h)^T)^H\right] \quad (9)$$

Processing of calculating an evaluation value using the eigenvectors of the correlation matrices $R_t$ and $R_r$ determined by expressions (8) and (9), and detecting a target on the basis of the evaluation value may be the same as the processing in step S5 and step S7 and thereafter of the first embodiment.

Next, another modification will be described.

The configuration of the radar apparatus 100 of the other modification in the second embodiment of the present invention is the same as the configuration illustrated in FIGS. 1 and 2, except for the operations of the separation unit 10 and the correlation matrix calculation unit 11. The operation of the other modification of the radar apparatus 100 in the second embodiment will be described with reference to the flowchart illustrated in FIG. 3.

When the radar apparatus 100 is a pulse hit system, in step S2, the separation units 10-1 to 10-N separate reception signals received by the receiving antennas 4-1 to 4-N, into signals corresponding to the waveforms of transmission signals, and then separate the separated signals on a per Doppler basis by pulse Doppler processing.

Thereafter, in step S4, the transmitting array correlation matrix calculation unit 11-1 determines the transmitting array correlation matrix $R_t$ for each Doppler. At this time, the transmitting array correlation matrix $R_t$ can be determined by expression (2).

Likewise, in step S6, the receiving array correlation matrix calculation unit 11-2 determines the receiving array correlation matrix $R_r$ for each Doppler. At this time, the receiving array correlation matrix $R_r$ can be determined by expression (4).

As discussed above, target reflected waves present in a plurality of hits are compressed in the Doppler direction into one, by the pulse Doppler processing, after which a correlation matrix for each Doppler is determined, such that the processing in step S5 and step S7 and thereafter can be performed in the same manner as in the first embodiment.

As described above, according to the radar apparatus 100 of the second embodiment of the present invention, the radar apparatus is a pulse hit system, and the correlation matrix calculation unit is configured to use hit directions as snapshots and determine the first correlation matrix and the second correlation matrix, using an ensemble average for each hit number.

Further, according to the radar apparatus 100 of the second embodiment of the present invention, the radar apparatus is a pulse hit system, and the correlation matrix calculation unit is configured to separate reception signals separated by the separation unit, on a per Doppler basis by pulse Doppler processing, and determine the first correlation matrix and the second correlation matrix for each Doppler.

Thus, even the pulse hit-system radar apparatus can separately detect a plurality of target reflected waves while suppressing degradation in angular resolution and increase in beam side lobes.

Third Embodiment

In the first and second embodiments, evaluation is performed on all ranges. A third embodiment is different in that a range at which a target is present is detected by beam forming using fixed weights, and evaluation is performed only on this range.

The present embodiment will be described with the focus on differences from the first and second embodiments.

The hardware configuration of a radar apparatus 200 in the third embodiment of the present invention is the same as the configuration illustrated in FIG. 1, except for internal processing of a signal processing unit 26.

Figure 7:
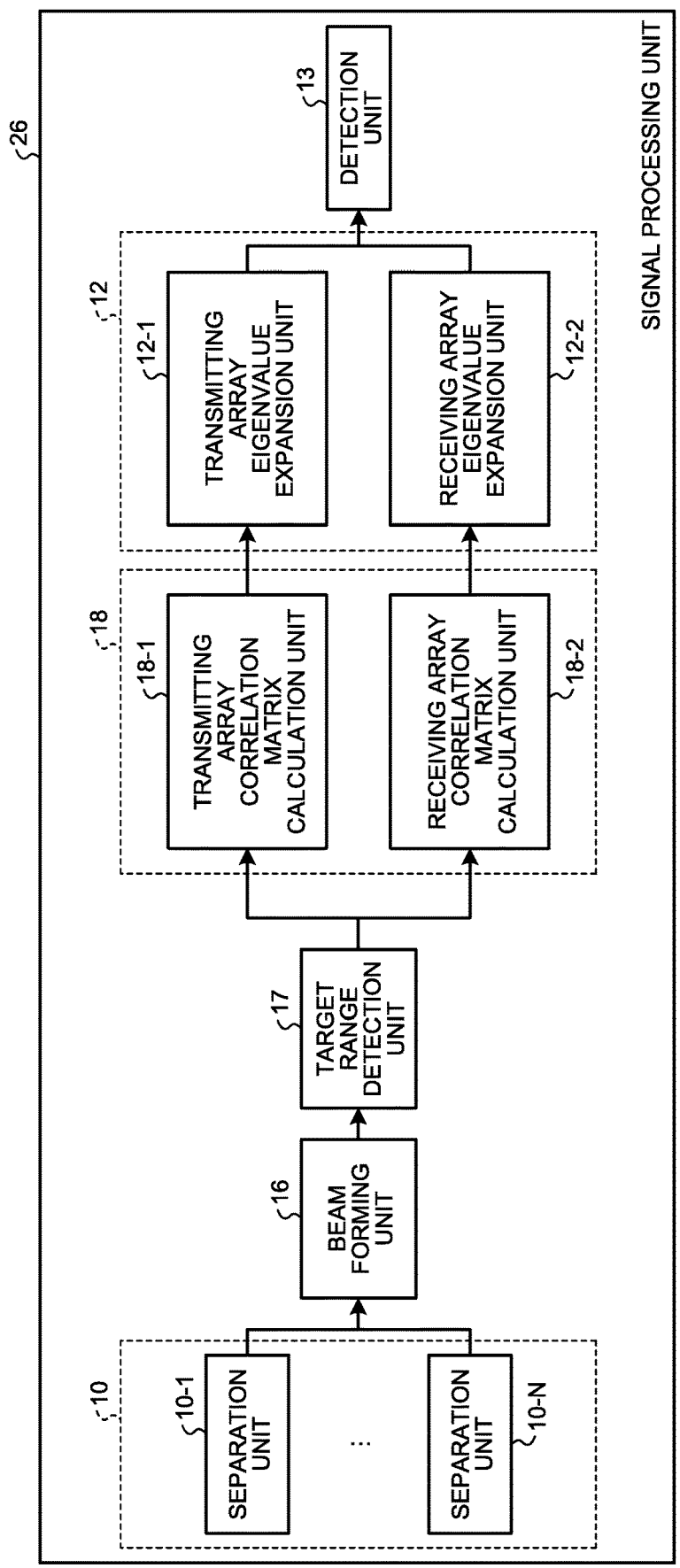
FIG. 7 is a functional block diagram illustrating the configuration of a signal processing unit of a radar apparatus in a third embodiment of the present invention.

FIG. 7 is a block diagram illustrating an example of the configuration of the signal processing unit 26 of the radar apparatus 200 in the third embodiment.

In FIG. 7, the signal processing unit 26 further includes a beam forming unit 16 and a target range detection unit 17 in addition to the configuration of the signal processing unit 6 of the first embodiment. The functions of the beam forming unit 16 and the target range detection unit 17 are implemented by the arithmetic unit 8 executing programs stored in the memory 9.

The beam forming unit 16 performs beam forming using fixed weights from reception signals that have been separated by the separation unit 10 on a per transmission signal basis. An output value of beam forming using the fixed weights is transmitted to the target range detection unit 17.

The target range detection unit 17 detects a range at which a target is present, from the output value of the beam forming using the fixed weights acquired from the beam forming unit 16. The detected range is transmitted to the correlation matrix calculation unit 18.

The correlation matrix calculation unit 18 determines correlation matrices on the basis of the reception signals that have been separated by the separation unit 10 on a per transmission signal basis, and the range detected by the target range detection unit 17. The correlation matrices are transmitted to the eigenvalue expansion unit 12.

Figure 8:
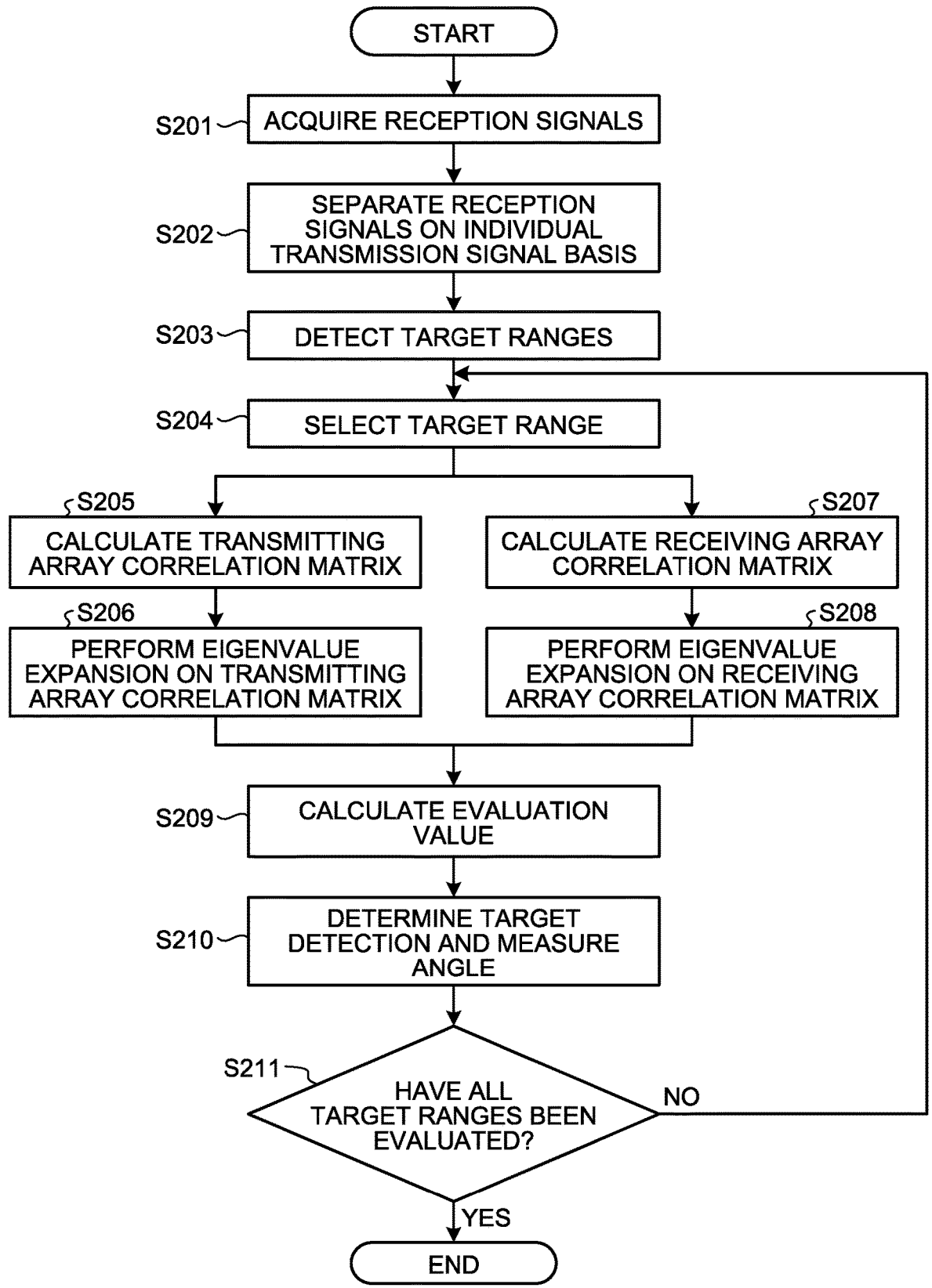
FIG. 8 is a flowchart illustrating the operation of the signal processing unit of the radar apparatus in the third embodiment of the present invention.

Next, the operation of the signal processing unit 26 of the radar apparatus 200 according to the third embodiment of the present invention will be described with reference to FIG. 8. FIG. 8 is a flowchart illustrating the operation of the signal processing unit 26 according to the third embodiment of the present invention.

Steps S201 and S202 are identical to steps S1 and S2 of the flowchart illustrated in FIG. 3, and thus will not be described.

In step S203, using reception signals that have been separated by the separation unit 10 on a per transmission signal basis, the beam forming unit 16 performs beam forming using fixed weights on samples of each range. The output of the beam forming using the fixed weights is as in expression (10). The output value of the beam forming is transmitted to the target range detection unit 17.

[Formula 10]

$$P_{DBF}(u) = \frac{|a_t^H(u) X a_r^*(u)|^2}{[a_t^H(u)a_t(u)][a_r^H(u)a_r(u)]} \quad (10)$$

The target range detection unit 17 determines the maximum value of the output of the beam forming using the fixed weights for each range. When the maximum value is equal to or greater than a threshold value, the target range detection unit 17 determines that a target is present at the range. The range at which it is determined that the target is present is transmitted to the correlation matrix calculation unit 18.

In step S204, a transmitting array correlation matrix calculation unit 18-1 and a receiving array correlation matrix calculation unit 18-2 select one range from among the ranges detected in step S203, and extract samples at the selected range from the reception signals that have been separated into signals corresponding to the transmission signals in step S202.

Steps S205 to S210 are identical to steps S4 to S9 in the flowchart illustrated in FIG. 3, and thus will not be described.

In step S211, the transmitting array correlation matrix calculation unit 18-1 and the receiving array correlation matrix calculation unit 18-2 determine whether all the ranges detected in step S203 have been evaluated, that is, determination of whether processing from step S204 to step S210 has been made on all the ranges detected in step S203. When the evaluation has been completed (yes), the process is finished. If not (no), the process returns to step S204 to start the processing for the next range.

As described above, the radar apparatus 200 of the third embodiment of the present invention further includes the target range detection unit that detects a range at which a target is present, on the basis of a beam formed using fixed weights from reception signals separated by the separation unit. The correlation matrix calculation unit is configured to determine the first correlation matrix and the second correlation matrix only on the range detected by the target range detection unit. That is, correlation matrix calculation and eigenvalue expansion requiring a large amount of computation are performed only on a range at which a target is detected. As a result, the amount of computation of the entire processing can be reduced.

The present invention is not limited to the configurations of the embodiments. Within the scope of the invention, the embodiments may be combined freely, or the embodiments may be modified or omitted as appropriate.

REFERENCE SIGNS LIST

1 transmission and reception control device; 2-1 transmitter; 2-M transmitter; 3 transmitting array antenna; 3-1 transmitting antenna; 3-M transmitting antenna; 4 receiving array antenna; 4-1 receiving antenna; 4-N receiving antenna; 5-1 receiver; 5-N receiver; 6 signal processing unit; 7 input interface; 8 arithmetic unit; 9 memory; 10 separation unit; 10-1 separation unit; 10-N separation unit; 11 correlation matrix calculation unit; 11-1 transmitting array correlation matrix calculation unit (first correlation matrix calculation unit); 11-2 receiving array correlation matrix calculation unit (second correlation matrix calculation unit); 12 eigenvalue expansion unit; 12-1 transmitting array eigenvalue expansion unit; 12-2 receiving array eigenvalue expansion unit; 13 detection unit; 16 beam forming unit; 17 target range detection unit; 18 correlation matrix calculation unit; 18-1 transmitting array correlation matrix calculation unit (first correlation matrix calculation unit); 18-2 receiving array correlation matrix calculation unit (second correlation matrix calculation unit); 26 signal processing unit; 100 radar apparatus; 200 radar apparatus.

The invention claimed is:

1. A radar apparatus comprising:
a transmitting array antenna to transmit signals orthogonal to one another from a plurality of transmitting antennas;
a receiving array antenna to receive the signals reflected from a target by a plurality of receiving antennas; and
a signal processor to detect the target from reception signals received by the plurality of receiving antennas, the signal processor comprising:
a separator to separate the reception signals received by the plurality of receiving antennas, into signals corresponding to transmission signals from the plurality of transmitting antennas;
a correlation matrix calculator to, on a basis of the reception signals separated by the separator, determine a first correlation matrix corresponding to the transmitting array antenna and a second correlation matrix corresponding to the receiving array antenna; and
a detector to detect the target on the basis of an evaluation value calculated using eigenvectors of the first correlation matrix and the second correlation matrix.

2. The radar apparatus according to claim 1, wherein the evaluation value is calculated by combining the eigenvectors corresponding to an eigenvalue equal to or greater than a predetermined value.

3. The radar apparatus according to claim 1, wherein the evaluation value is calculated using lengths of projection of the eigenvectors of the first correlation matrix and the second correlation matrix and steering vectors of the transmitting array antenna and the receiving array antenna.

4. The radar apparatus according to claim 1, wherein the evaluation value is calculated using noise subspaces of the first correlation matrix and the second correlation matrix.

5. The radar apparatus according to claim 1, wherein the detector detects the target on the basis of the evaluation value calculated with a direction of arrival of the reception signals varied.

6. The radar apparatus according to claim 1, wherein the correlation matrix calculator selects samples corresponding to a predetermined range, from the reception signals separated by the separator, and determines the first correlation matrix and the second correlation matrix on the range.

7. The radar apparatus according to claim 1, wherein
the radar apparatus is a pulse hit system, and
the correlation matrix calculator uses hit directions as snapshots, and determines the first correlation matrix and the second correlation matrix, using an ensemble average for each hit number.

8. The radar apparatus according to claim 1, wherein
the radar apparatus is a pulse hit system, and
the correlation matrix calculator separates the reception signals separated by the separator, on a per Doppler basis by pulse Doppler processing, and determines the first correlation matrix and the second correlation matrix for each Doppler.

9. The radar apparatus according to claim 1, further comprising:
a target range detector to detect a range at which the target is present, on the basis of a beam formed using fixed weights from the reception signals separated by the separator,
wherein the correlation matrix calculator determines the first correlation matrix and the second correlation matrix only on the range detected by the target range detector.

* * * * *